United States Patent
Kelley et al.

(10) Patent No.: US 6,467,244 B1
(45) Date of Patent: Oct. 22, 2002

(54) HORSE BLANKET

(75) Inventors: Nancy D. Kelley; Malcolm E. Kelley, both of Yellow Springs, OH (US)

(73) Assignee: Kelley Equestrian Products, Yellow Springs, OH (US)

( * ) Notice: Subject to any disclaimer, the term of this patent is extended or adjusted under 35 U.S.C. 154(b) by 0 days.

(21) Appl. No.: 09/680,101

(22) Filed: Oct. 5, 2000

Related U.S. Application Data

(60) Provisional application No. 60/158,466, filed on Oct. 8, 1999.

(51) Int. Cl.[7] .............................. B68C 5/00; A01K 13/00
(52) U.S. Cl. ......................................... 54/79.2; 119/850
(58) Field of Search ................................ 54/79.2, 79.1, 54/80.1; 119/850, 174; 2/456

(56) References Cited

U.S. PATENT DOCUMENTS

| | | | |
|---|---|---|---|
| 448,376 A | | 3/1891 | Sisson |
| 484,996 A | | 10/1892 | Chamberlain |
| 658,894 A | | 10/1900 | Gordon |
| 660,414 A | | 10/1900 | Carli |
| 798,320 A | * | 8/1905 | Carli ........................... 54/79.2 |
| 889,391 A | * | 6/1908 | Nagel ........................... 54/79.2 |
| 919,038 A | | 4/1909 | Lee |
| 1,028,138 A | | 6/1912 | Schleicher |
| 1,028,581 A | * | 6/1912 | Lyman ........................ 54/79.2 |
| 1,218,004 A | * | 3/1917 | Sayles ......................... 54/79.2 |
| 4,955,182 A | * | 9/1990 | Newman ...................... 54/79.2 |
| 5,125,220 A | | 6/1992 | Martin |
| 5,134,836 A | * | 8/1992 | Harty .............................. 54/23 |
| 5,161,352 A | | 11/1992 | Schneider et al. |
| 5,361,563 A | * | 11/1994 | Llamas ........................ 54/79.2 |
| 5,839,395 A | | 11/1998 | Kelley et al. |

OTHER PUBLICATIONS

Brochure, The Rambo Wug The Shape of Things to Come.
Advertisement, Storm King Cordura Full Hood.
Advertisement, SS Scheider.
Advertisement, Turnout Sheets, Fly Sheets.

* cited by examiner

*Primary Examiner*—Peter M. Poon
*Assistant Examiner*—Son T. Nguyen
(74) *Attorney, Agent, or Firm*—Killworth, Gottman, Hagan & Schaeff, L.L.P

(57) ABSTRACT

A horse blanket is provided. According to one embodiment of the present invention, a blanket is provided comprising a body of blanket material and a closure fastening assembly. The body of blanket material defines a major blanket portion, a wither/shoulder portion, a neckline, and a front closure portion. The front closure portion comprises a first closure flap including a first closure flap end portion positioned along the neckline and a second closure flap including a second closure flap end portion positioned along the neckline. The closure fastening assembly is coupled to the body of blanket material and comprises a first releasable wither/shoulder attachment arranged to couple the first closure flap end portion to the wither/shoulder portion substantially along a portion of the neckline, and a second releasable wither/shoulder attachment arranged to couple the second closure flap end portion to the wither/shoulder portion substantially along a portion of the neckline. The second releasable wither/shoulder attachment extends entirely along an interior side of the body of blanket material. According to another embodiment of the present invention, a portion of the second releasable wither/shoulder attachment passes from an interior side of the body of blanket material, through the neck opening, and around the neckline to the exterior side of the body of blanket material.

5 Claims, 5 Drawing Sheets

HORSE BLANKET

CROSS-REFERENCE TO RELATED APPLICATIONS

This application claims the benefit of U.S. Provisional Patent Application Ser. No. 60/158,466, HORSE BLANKET, filed Oct. 8, 1999.

BACKGROUND OF THE INVENTION

The present invention relates to horse blankets and, more particularly, to a horse blanket incorporating overlapping front closure flaps and an elastic portion oriented about a neck opening defined by the horse blanket.

Conventional horse blankets are provided to protect a horse from mud, dirt, and moisture, and to provide a degree of thermal insulation. These conventional horse blankets typically conform to the shape of a horse's upper body to provide adequate protection from the elements and reduce discomfort. However, an unfortunate result of this fitted design is that movement of the horse's head and neck causes the horse blanket to bind about the horse's neck when the horse lowers his head. Additionally, repeated lowering and raising of the head typically results in substantial misalignment of the horse blanket about the horse.

Accordingly, a need exists for a horse blanket that alleviates blanket misalignment and blanket binding about the neck as a result of raising and lowering of the horse's head.

BRIEF SUMMARY OF THE INVENTION

This need is met by the present invention wherein a horse blanket is provided comprising overlapping front closure flaps and an elastic portion oriented about a portion of a periphery of a neck opening defined by the horse blanket. Accordingly, it is an object of the present invention to provide an improved horse blanket for alleviating blanket binding about the neck of a horse and for substantially eliminating blanket misalignment resulting from raising and lowering of the horse's head.

According to one embodiment of the present invention, a blanket is provided comprising a body of blanket material and a closure fastening assembly. The body of blanket material defines a major blanket portion, a wither/shoulder portion, a neckline, and a front closure portion. The front closure portion comprises a first closure flap including a first closure flap end portion positioned along the neckline and a second closure flap including a second closure flap end portion positioned along the neckline. The closure fastening assembly is coupled to the body of blanket material and comprises a first releasable wither/shoulder attachment arranged to couple the first closure flap end portion to the wither/shoulder portion substantially along a portion of the neckline, and a second releasable wither/shoulder attachment arranged to couple the second closure flap end portion to the wither/shoulder portion substantially along a portion of the neckline. The second releasable wither/shoulder attachment extends entirely along an interior side of the body of blanket material.

The first releasable wither/shoulder attachment may include a first wither/shoulder securement positioned on an exterior side of the body of blanket material. The second releasable wither/shoulder attachment may include a second wither/shoulder securement positioned on the interior side of the body of blanket material. The blanket may further comprise a section of protective anti-chafing material positioned proximate the second releasable wither/shoulder attachment on the interior side of the blanket material.

According to another embodiment of the present invention, a blanket is provided comprising a body of blanket material defining a major blanket portion, a wither/shoulder portion, a neckline, and a front closure portion. The front closure portion comprises a first closure flap including a first closure flap end portion positioned along the neckline and a second closure flap including a second closure flap end portion positioned along the neckline. A first releasable wither/shoulder attachment is arranged to couple the first closure flap end portion to the wither/shoulder portion along a portion of the neckline. The first releasable wither/shoulder attachment comprises a first strap having a first end coupled to the first closure flap end portion and a second end opposite the first end of the first strap and a first wither/shoulder securement having a first end coupled to the wither/shoulder portion on an exterior side of the body of blanket material and a second end opposite the first end of the first securement. A a second releasable wither/shoulder attachment is arranged to couple the second closure flap end portion to the wither/shoulder portion along the neckline. The second releasable wither/shoulder attachment comprises a second strap having a first end coupled to the second closure flap end portion and a second end opposite the first end of the second strap and a second wither/shoulder securement having a first end coupled to the wither/shoulder portion on an interior side of the body of blanket material and a second end opposite the first end of the second securement.

A section of protective anti-chafing material may be positioned proximate the second releasable wither/shoulder attachment on the interior side of the blanket material. A first releasable clip may be arranged to couple the second end of the first strap to the second end of the first securement on an exterior side of the body of blanket material. A second releasable clip may be arranged to couple the second end of the second strap to the second end of the second securement on an interior side of the body of blanket material.

According to yet another embodiment of the present invention, an animal blanket defining a dressed configuration is provided. The dressed configuration comprises a body of blanket material and a closure fastening assembly. The body of blanket material defines a major blanket portion, a wither/shoulder portion, a neckline, and a front closure portion. The front closure portion comprises a first closure flap including a first closure flap end portion positioned along the neckline and a second closure flap including a second closure flap end portion positioned along the neckline. The first closure flap overlaps the second closure flap and the first closure flap, the second closure flap, and the wither/shoulder portion define a neck opening. The closure fastening assembly is coupled to the body of blanket material and comprises first and second releasable wither/shoulder attachments. The first releasable wither/shoulder attachment is arranged to couple the first closure flap end portion to the wither/shoulder portion substantially along a portion of the neckline. The second releasable wither/shoulder attachment is arranged to couple the second closure flap end portion to the wither/shoulder portion substantially along a portion of the neckline. A portion of the second releasable wither/shoulder attachment passes from an interior side of the body of blanket material, through the neck opening, and around the neckline to the exterior side of the body of blanket material.

DETAILED DESCRIPTION OF THE INVENTION

Figure 1:
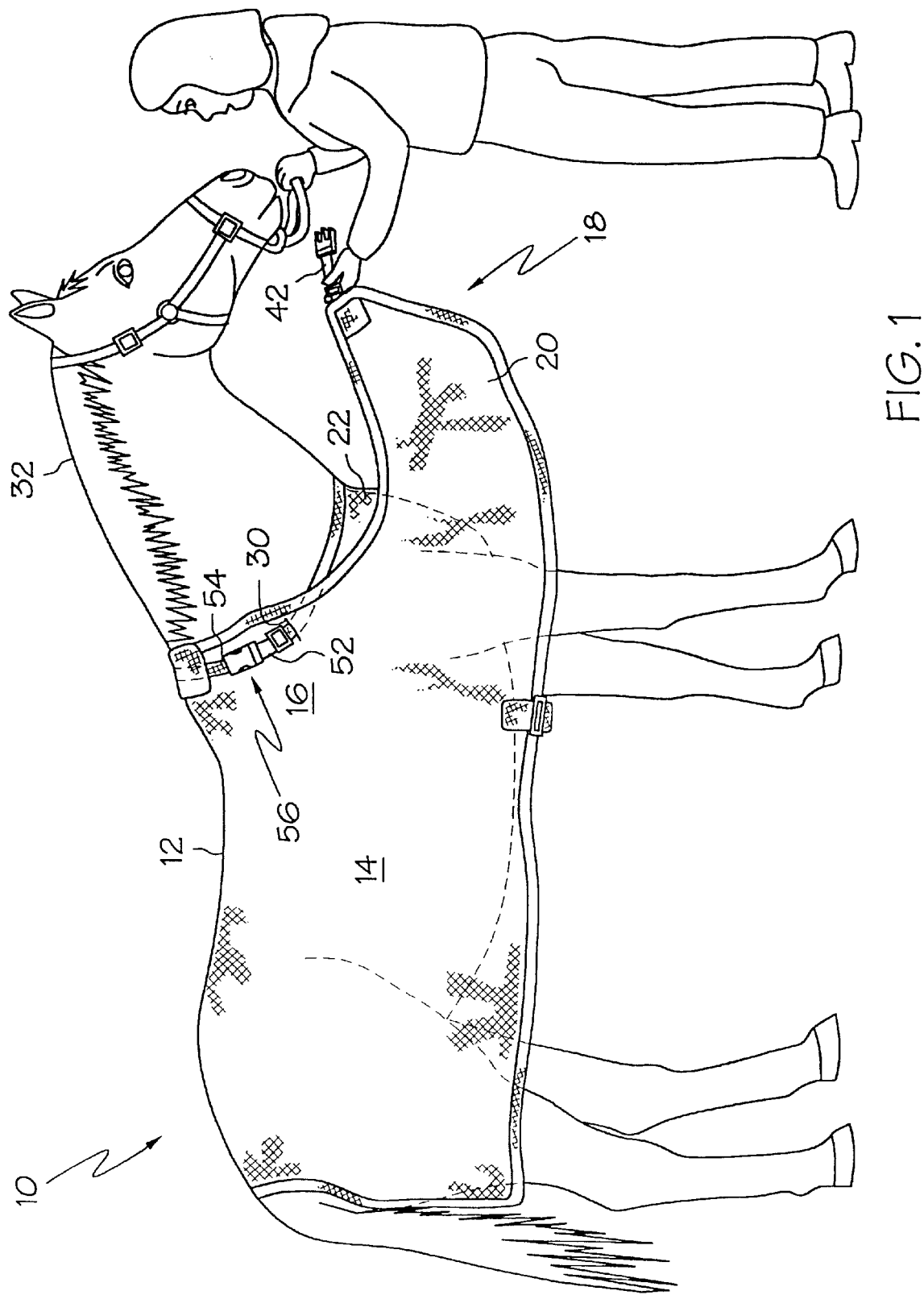
FIG. 1 is a right side plan view of a horse blanket according to the present invention.
Figure 2:
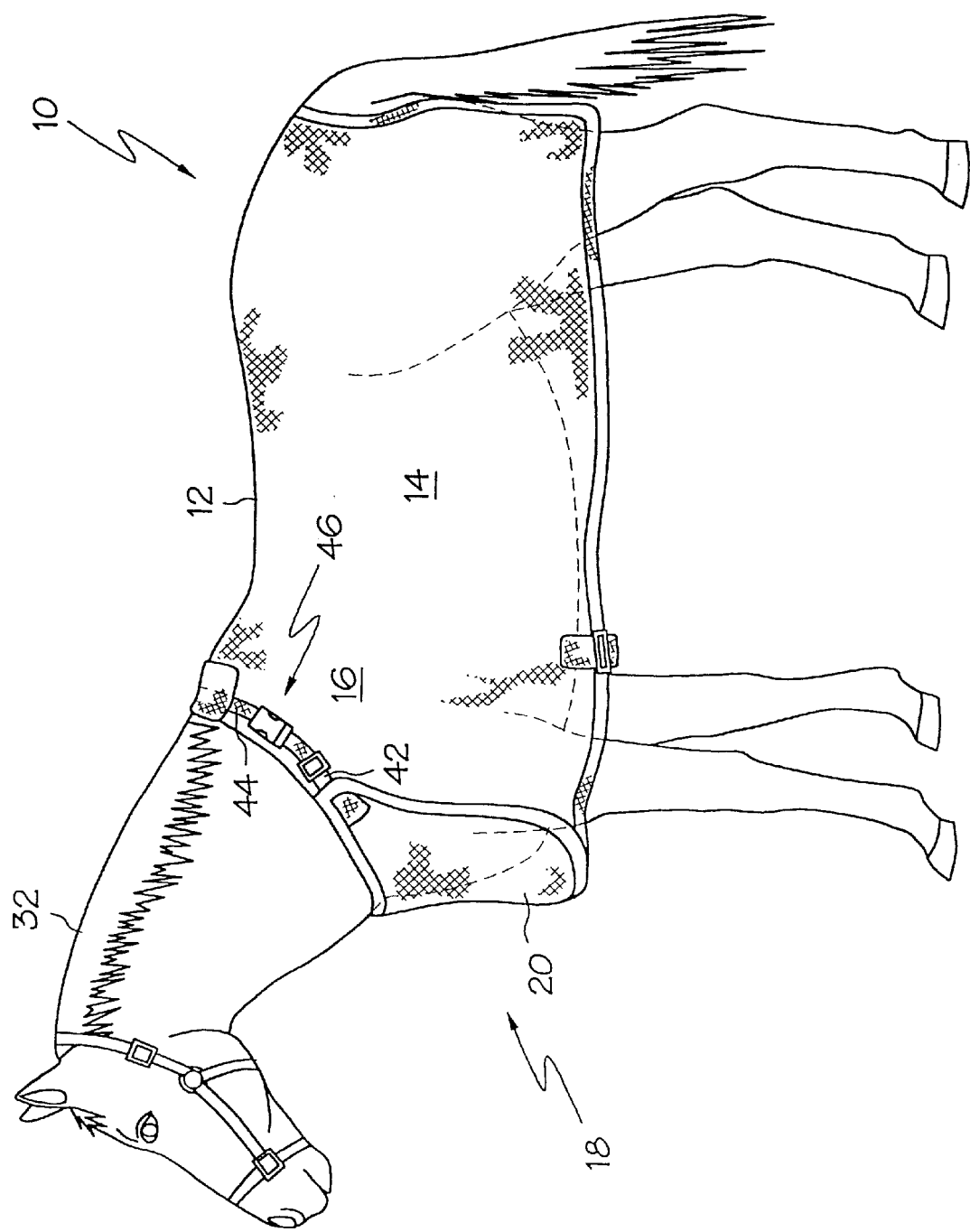
FIG. 2 is a left side plan view of a horse blanket according to the present invention.
Figure 3:
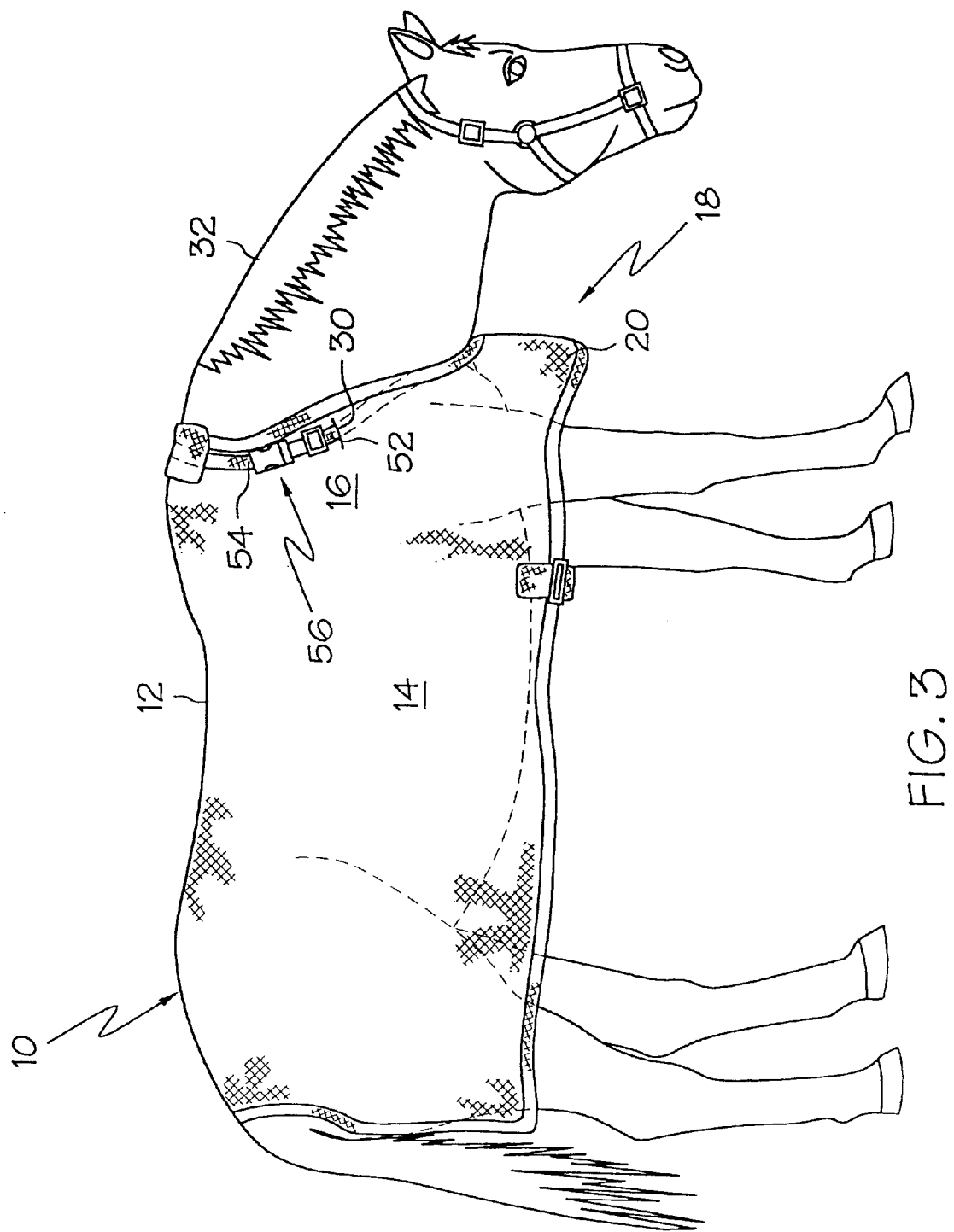
FIG. 3 is a right side plan view of a horse blanket according to the present invention in a head-down position.
Figure 4:
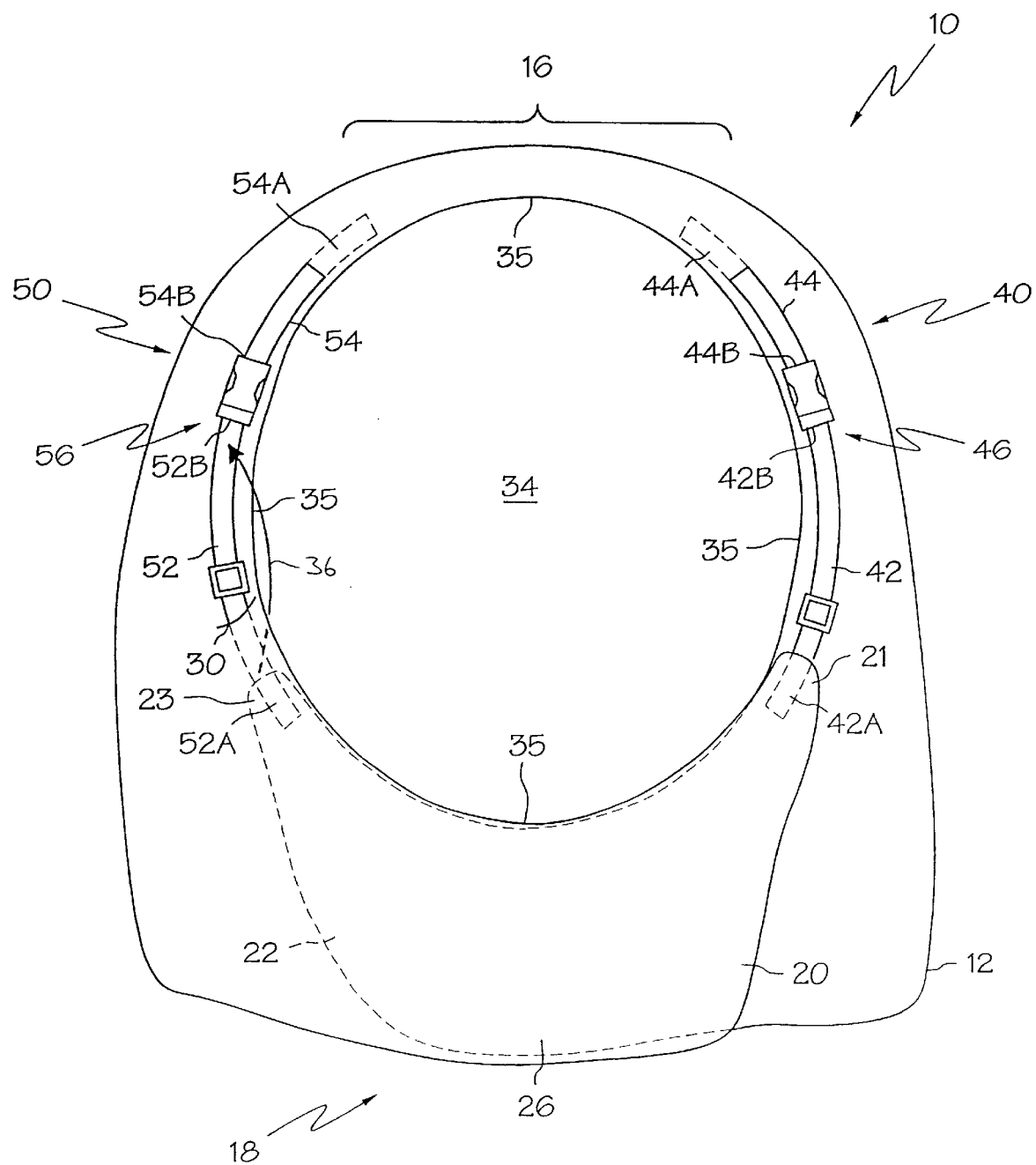
FIGS. 4 and 5 are front plan views of horse blankets according to different embodiments of the present invention.

Referring to FIGS. 1–4, where like structure is identified with like reference numerals, a horse blanket 10 according to the present invention is described in detail. The horse blanket 10 comprises a body of blanket material 12 defining a major blanket portion 14, a wither/shoulder portion 16, and a front closure portion 18. The front closure portion 18 comprises first and second closure flaps 20, 22. As is clearly illustrated in FIG. 4, the first closure flap 20 includes a first closure flap end portion 21 and the second closure flap 22 includes a second closure flap end portion 23. A closure fastening assembly is coupled to the body of blanket material 12 and comprises a first releasable wither/shoulder attachment 40 and a second releasable wither/shoulder attachment 50. The first releasable wither/shoulder attachment 40 is coupled to the wither/shoulder portion 16 and the first closure flap 20. The second releasable wither/shoulder attachment 50 is coupled to the wither/shoulder portion 16 and the second closure flap 22.

A wither/shoulder attachment passage 30 may be provided in the wither/shoulder portion 16 proximate the first closure flap 20 and extends from an interior side of the body of blanket material 12 to an exterior side of the body of blanket material 12. The passage 30 is positioned to pass a portion of the second releasable wither/shoulder attachment 50 there through. A neck opening 34 is defined by the body of blanket material 12 and the periphery of the neck opening 34 is bounded by a neckline 35 of the blanket 10. If the wither/shoulder attachment passage 30 is not employed, it is noted that the portion of the second releasable wither/shoulder attachment 50 that would otherwise pass through the passage 30 may be arranged to pass from beneath the first closure flap 20, through the neck opening 34, and around the neckline 35 to the opposite side of the blanket 10, as is indicated by arrow 36 in FIG. 4.

Figure 5:
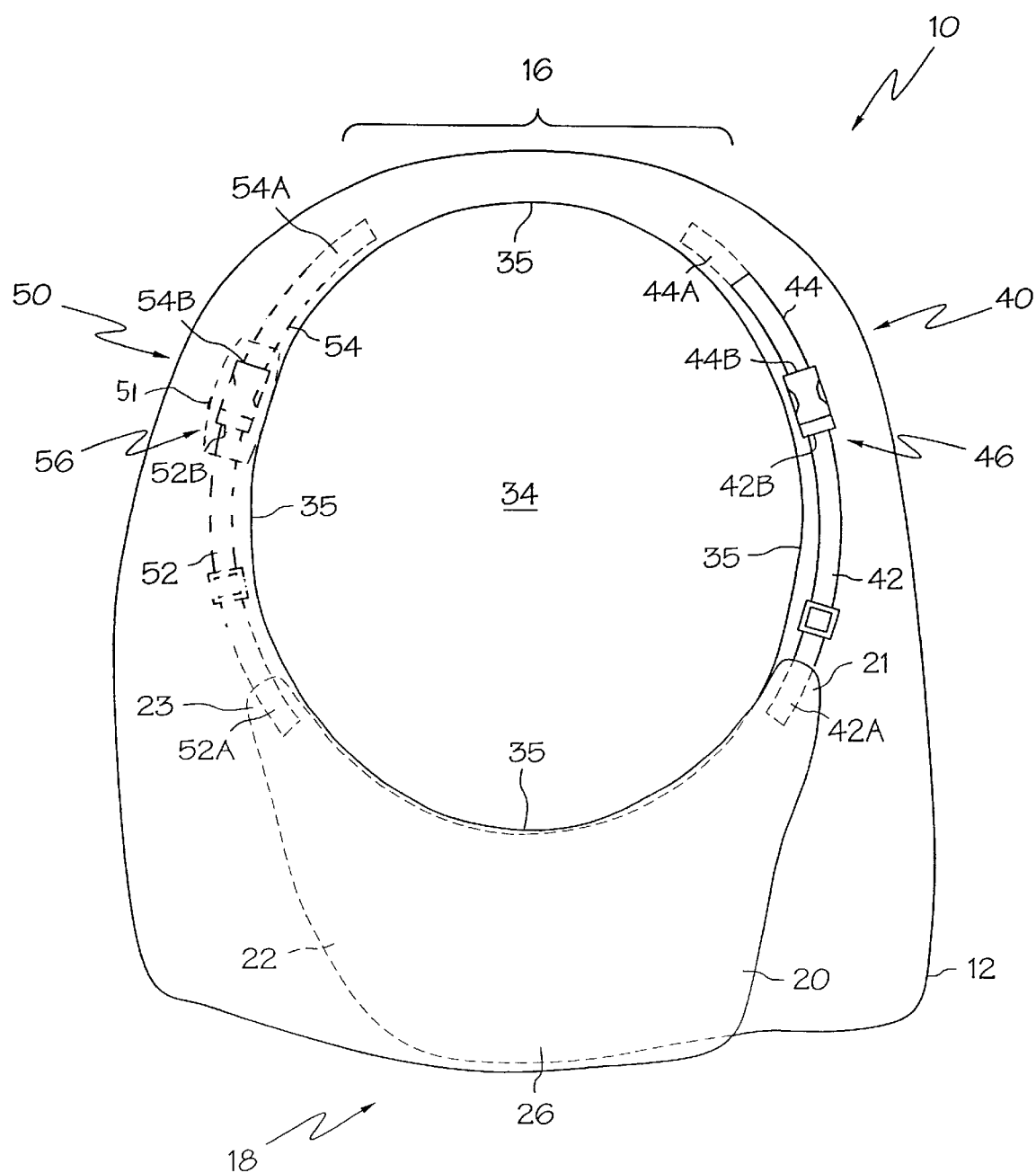

As a further alternative, as is illustrated in FIG. 5, the entire second releasable wither/shoulder attachment 50 may be provided beneath the first closure flap 20 and the wither/shoulder portion 16 such that it is sandwiched between the blanket 10 and the body of the horse. In this manner, as is clearly illustrated in FIG. 5, the first releasable wither/shoulder attachment 40 includes a first wither/shoulder securement 44 positioned on an exterior side of the body of blanket material 12 and the second releasable wither/shoulder attachment 50 includes a second wither/shoulder securement 54 positioned on an interior side of the body of blanket material 12. According to this alternative, where the entire second releasable wither/shoulder attachment 50 is positioned between the blanket 10 and the horse on the underside of the first closure flap 20, it may be preferable to provide a layer of protective anti-chafing material 51 between the second releasable wither/shoulder attachment 50 and the body of the horse. The specific nature, thickness, width, and length of the anti-chafing material 51 is not the subject of the present invention and it is noted that any one of a number of materials may be employed for such a purpose.

To alleviate blanket binding and misalignment when a horse 32 moves its head up and down, at least one of the first releasable wither/shoulder attachment 40, the second releasable wither/shoulder attachment 50, the wither/shoulder portion 16, the first closure flap 20, and the second closure flap 22, is provided with an elastic portion a oriented about a portion of a periphery of the neck opening 34 defined by the body of blanket material 12. As is clearly illustrated in FIG. 4, the periphery of the neck opening 34 is bounded by a neckline 35 of the blanket 10. The elastic portion permits the area of the neck opening 34 to expand as the horse 32 lowers its head in the manner indicated in FIG. 3. In the case of an average sized thoroughbred, the elastic portion is preferably designed to provide about 14"(35 cm) of neck opening expansion as a result of its longitudinal flexibility. Further, the strength of the elastic portion is selected to ensure a comfortably snug fit about the horse's neck. It is contemplated by the present invention that the amount of neck opening expansion necessarily provided by the elastic portion varies as a function of the size of the animal at issue and the extent to which the animal typically moves its head and neck.

According to one embodiment of the present invention, the elastic portion comprises first and second elastic straps 42, 52 provided in the first releasable wither/shoulder attachment 40 and the second releasable wither/shoulder attachment 50. The first releasable wither/shoulder attachment 40 comprises the first elastic strap 42, a first wither/shoulder securement 44, and a first releasable clip 46. The first elastic strap 42 has a first end 42A coupled to the first closure flap 20, and a second end 42B opposite the first end 42A of the first elastic strap 42. The first wither/shoulder securement 44 has a first end 44A coupled to the wither/shoulder portion 16 and a second end 44B opposite the first end 44A of the first securement 44. The first releasable clip 46 is coupled to the second end 42B of the first elastic strap 42 and the second end 44B of the first securement 44 and is operative to couple releasably the first elastic strap 42 and the first securement 44.

Similarly, the second releasable wither/shoulder attachment 50 comprises the second elastic strap 52, a second wither/shoulder securement 54, and a second releasable clip 56. The second elastic strap 52 has a first end 52A coupled to the second closure flap 22, and a second end 52B opposite the first end 52A of the second elastic strap 52. The second wither/shoulder securement 54 has a first end 54A coupled to the wither/shoulder portion 16 and a second end 54B opposite the first end 54A of the second securement 54. The second releasable clip 56 is coupled to the second end 52B of the second elastic strap 52 and the second end 54B of the second securement 54 and is operative to couple releasably the second elastic strap 52 and the second securement 54.

It is contemplated by the present invention that the hardware utilized in the first and second releasable wither/shoulder attachments 40, 50 of the present invention may incorporate adjustment and fitting components to enable proper dressing of the horse blanket 10 about the horse 32. It is further contemplated by the present invention that the first and second securements 44, 54 may be provided as part of a single length of strap extending across the wither/shoulder portion 16 of the horse blanket 10.

Alternatively, the elastic portion comprises a portion of stretch fabric, i.e., a fabric designed to contribute a predetermined amount of elasticity, to the horse blanket 10. The stretch fabric is positioned in any of a plurality of positions about the periphery of the neck opening 34. For example, the wither/shoulder portion 16, or the first and second closure flaps 20, 22, may be constructed of, in whole or in part, a stretch fabric portion.

The horse blanket 10 illustrated in FIGS. 1–4 defines a dressed configuration, i.e., the configuration of the horse blanket as it is positioned on and about the upper body of the horse 32. In the dressed configuration, the first closure flap 20 overlaps the second closure flap 22. In the case of a standard or average sized thoroughbred, the first closure flap 20 and the second closure flap 22 preferably define an overlap portion 26 of about 20"(51 cm) to about 30" 1(76 cm) extending across the front closure portion 18 of the dressed configuration. The size of the overlap portion will vary depending upon the size of the animal to be fitted with the blanket 10. Further, a portion of the second releasable wither/shoulder attachment 50 passes through the passage 30.

Having described the invention in detail and by reference to preferred embodiments thereof, it will be apparent that modifications and variations are possible without departing from the scope of the invention defined in the appended claims. For example, it is contemplated that the blanket described herein may be utilized on other animals, e.g., llamas, sheep, donkeys, goats, cats, dogs, hogs, etc.

What is claimed is:

1. A blanket for covering a horse comprising:
   a body of blanket material defining an exterior side, an interior side, a major blanket portion, a wither/shoulder portion, a neckline, and a front closure portion, said front closure portion comprising
      a first closure flap including a first closure flap end portion positioned along said neckline, and
      a second closure flap including a second closure flap end portion positioned along said neckline; and
   a closure fastening assembly coupled to said wither/shoulder portion of said body of blanket material, said closure fastening assembly comprising
      a first releasable wither/shoulder attachment arranged to couple said first closure flap end portion to said wither/shoulder portion substantially along a portion of said neckline, wherein said first releasable wither/shoulder attachment is positioned on said exterior side of said body of blanket material,
      a second releasable wither/shoulder attachment arranged to couple said second closure flap end portion to said wither/shoulder portion substantially along a portion of said neckline, wherein said second releasable wither/shoulder attachment extends beneath said first closure flap and said wither/shoulder portion such that said second releasable wither/shoulder attachment is positioned on said interior side of said body of blanket material and lies between said body of blanket material and said horse when coupling said second closure flap end portion to said wither/shoulder portion.

2. A blanket as claimed in claim 1 further comprising a section of protective antichafing material positioned proximate the second releasable wither/shoulder attachment on said interior side of said blanket material.

3. A blanket for covering a horse comprising:
   a body of blanket material defining an exterior side, an interior side, a major blanket portion, a wither/shoulder portion, a neckline, and a front closure portion, said front closure portion comprising
      a first closure flap including a first closure flap end portion positioned along said neckline, and
      a second closure flap including a second closure flap end portion positioned along said neckline; and
   a first releasable wither/shoulder attachment arranged to couple said first closure flap end portion to said wither/shoulder portion along a portion of said neckline, said first releasable wither/shoulder attachment comprising
      a first strap having a first end coupled to said first closure flap end portion and a second end opposite said first end of said first strap, and
      a first wither/shoulder securement having a first end coupled to said wither/shoulder portion on said exterior side of said body of blanket material and a second end opposite said first end of said first securement,
      a first releasable clip arranged to couple said second end of said first strap to said second end of said first securement on said exterior side of said body of blanket material; and
   a second releasable wither/shoulder attachment arranged to couple said second closure flap end portion to said wither/shoulder portion along said neckline, said second releasable wither/shoulder attachment comprising
      a second strap having a first end coupled to said second closure flap end portion and a second end opposite said first end of said second strap,
      a second wither/shoulder securement having a first end coupled to said interior side of said body of blanket material at said wither/shoulder portion along said neckline of said body of blanket material and a second end opposite said first end of said second securement, and
      a second releasable clip arranged to couple said second end of said second strap to said second end of said second securement on said interior side of said body of blanket material at said wither/shoulder portion along said neckline of said body of blanket material such that when said second end of said second wither/shoulder securement is coupled to said second strap, said second releasable wither/shoulder attachment extends beneath said first closure flap and said wither/shoulder portion such that said second releasable wither/shoulder attachment is positioned on said interior side of said body of blanket material and lies between said body of blanket material and said horse.

4. A blanket as claimed in claim 3 further comprising a section of protective antichafing material positioned proximate the second releasable wither/shoulder attachment on said interior side of said blanket material.

5. A blanket for covering a horse comprising:
   a body of blanket material defining an exterior side, an interior side, a major blanket portion, a wither/shoulder portion, a neckline, and a front closure portion,
   said neckline comprising an elastic portion that is positioned along at least a portion of said neckline,
   said front closure portion comprising
      a first closure flap including a first closure flap end portion positioned along said neckline, and
      a second closure flap including a second closure flap end portion positioned along said neckline,
   a closure fastening assembly coupled to said wither/shoulder portion of said body of blanket material, said closure fastening assembly comprising
      a first releasable wither/shoulder attachment arranged to couple said first closure flap end portion to said wither/shoulder portion substantially along a portion of said neckline, wherein said first releasable wither/shoulder attachment is positioned on said exterior side of said body of blanket material, a second releasable wither/shoulder attachment arranged to couple said second closure flap end portion to said wither/shoulder portion substantially along a portion of said neckline, wherein said second releasable wither/shoulder attachment extends beneath said first closure flap and said wither/shoulder portion such that said second releasable wither/shoulder attachment is positioned on said interior side of said body of blanket material and lies between sad body of blanket material and said horse when coupling said second closure flap end portion to said wither/shoulder portion.

* * * * *